UNITED STATES PATENT OFFICE.

ALFRED ERNEST DAVIES, OF BILSTON, ENGLAND.

MANUFACTURE OF STEEL BY THE BASIC OPEN-HEARTH PROCESS.

1,198,827.      Specification of Letters Patent.      Patented Sept. 19, 1916.

No Drawing.      Application filed September 21, 1915. Serial No. 51,778.

*To all whom it may concern:*

Be it known that I, ALFRED ERNEST DAVIES, a subject of the Kingdom of Great Britain, residing at 33 Green Lanes, Bilston, in the county of Stafford, England, metallurgist, have invented certain new and useful Improvements in or Relating to the Manufacture of Steel by the Basic Open-Hearth Process, of which the following is a specification.

This invention has relation to the manufacture of steel by the basic open hearth process in a tilting furnace.

The essential part of the invention consists in coating the bottom and sides of the basic lined bath of the furnace with a slag enriched in the manner hereinafter described after the metal of a previous charge has been tapped out. The coating is effected in the following manner: There is retained in the furnace after the tapping of the metal a specially produced rich limy slag which has been formed in the latter part of the process and this slag is greatly enriched and thickened by lime and metallic oxids. This enriched and thickened slag is then caused to adhere to the bottom and sides of the basic lining by tilting the furnace backward and forward repeatedly, the result being a very limy and oxidizing slag on the bath lining of the furnace ready in a highly heated condition to react at once on the charge of molten pig iron to be immediately added.

In practice the process is worked as follows:—Assume that there is in the furnace a molten charge of metal and slag which has been partially worked in the usual way until the bulk of the silicon and phosphorus in the metal have been removed, the slag is then tapped off by tilting the furnace and further additions of lime, iron ore, and oxids are made to the furnace, in order to remove the last traces of impurities, thus forming in the second part of the process the rich slag above mentioned, which it is intended to retain in the furnace for the purpose of coating the lining. The metal is tapped off when finished without allowing the slag to run out, and the slag is further enriched and thickened by lime and metallic oxid additions and the furnace tilted repeatedly as above described in order to coat the enriched and thickened slag on the bottom and sides of the furnace lining ready for the next charge of molten pig iron which is then poured in and a reaction commences which removes the bulk of the impurities, this bringing us to the point which the description of this process started.

What I claim as my invention and desire to secure by Letters Patent is:—

A process for the manufacture of steel in a basic open hearth tilting furnace, consisting in retaining in the furnace after the tapping of the steel a rich limy slag formed in the latter part of the process of manufacturing such steel, greatly enriching and thickening such slag by the additions of lime and metallic oxids, coating the sides and bottom of the basic lining of the furnace with the slag thus enriched and thickened by repeatedly tilting the furnace backward and forward, and immediately introducing the subsequent charge of molten pig-iron into contact with the enriched and thickened slag adhering to the basic lining, while such slag is in a highly heated condition.

In witness whereof I have hereunto set my hand in the presence of two witnesses.

ALFRED ERNEST DAVIES.

Witnesses:
    ARTHUR HENRY BROWN,
    HOLLIS BROWN.

Copies of this patent may be obtained for five cents each, by addressing the "Commissioner of Patents, Washington, D. C."